United States Patent [19]

Furukawa et al.

[11] 3,902,965

[45] Sept. 2, 1975

[54] METHOD FOR PRODUCTION OF CITRIC ACID

[75] Inventors: Toshiro Furukawa; Hiroo Kaneyuki, both of Yamaguchi, Japan

[73] Assignee: Mitsui Petrochemical Industries, Ltd., Tokyo, Japan

[22] Filed: Nov. 15, 1973

[21] Appl. No.: 416,329

[30] Foreign Application Priority Data

Nov. 17, 1972 Japan............................. 47-114765

[52] U.S. Cl.................................. 195/28 R; 195/37
[51] Int. Cl.².......................................... C12D 1/04
[58] Field of Search...................... 195/28 R, 36, 47

[56] References Cited
UNITED STATES PATENTS

| | | | |
|---|---|---|---|
| 3,689,359 | 9/1972 | Fukuda et al. | 195/28 R |
| 3,801,455 | 4/1974 | Suzuki et al. | 195/28 R |

OTHER PUBLICATIONS

Buecher et al., "Cell wall composition of Saccharomycopsis", Cited in Chemical Abstracts 74:84180x (1971).

*Primary Examiner*—Lionel M. Shapiro
*Assistant Examiner*—R. B. Penland
*Attorney, Agent, or Firm*—Ladas, Parry, Von Gehr, Goldsmith & Deschamps

[57] ABSTRACT

Citric acid is formed by aerobically culturing a yeast belonging to the genus *Saccharomycopsis* and possessing an ability to produce citric acid by assimilating, as a main carbon source, at least one hydrocarbon in a culture medium which uses said assimilable compound as the carbon source and contains nitrogen sources, inorganic salts and, if necessary, other suitable nutrient sources. Citric acid is obtained by separating the formed citric acid from the culture medium.

15 Claims, No Drawings

METHOD FOR PRODUCTION OF CITRIC ACID

This invention relates to a method for the production of citric acid by use of microorganisms.

As to the production of citric acid by use of microorganisms, there have heretofore been known a process using filamentous fungi belonging to the species of *Aspergilus niger* and yeasts belonging to the genus *Candida* or *Pichia* on saccharine materials, a process using yeasts (belonging to the genus *Candida*), bacteria or filamentous fungi on normal paraffins, and the like.

The inventors have discovered that a strain belonging to the species of *Saccharomycopsis lipolytica* produces citric acid from hydrocarbons.

This invention provides a method for producing citric acid by the steps of aerobically culturing a yeast belonging to the genus *Saccharomycopsis* and possessing an ability to produce citric acid by assimilating, as a main carbon source, at least one hydrocarbon, in a culture medium which uses said assimilable compound as the carbon source and contains nitrogen sources, inorganic salts and, if necessary, other suitable nutrient sources thereby accumulating citric acid in the culture medium and isolating the formed citric acid from the culture medium.

The microbiological properties of the aforementioned strain belonging to the species of *Saccharomycopsis lipolytica* will be described herein below:

I. Growth on various culture media:
1. Liquid medium: YM (yeast extract, malt extract) liquid medium (cultured at 25°C. for 3 days):
   Circular, oval to ellipsoidal, 2.5 to 5.5 by 2.5 to 10 microns. Elongate cells and pseudomycelia were formed. Propagated by budding. Pellicles were formed and sediments produced.
2. Slant agar medium: YM (yeast extract, malt extract) agar medium (cultured at 25°C. for 10 days):
   Slight ocher in color. Colony was buttery and had a wavy surface, with a filamentous margin.
3. Dalmau plate culture on potato-glucose agar culture medium: Pseudomycelia were formed vigorously.

II. Formation of ascospores:
   The strain was subjected to mixed culture on a V-8* agar medium (medium comprising 8 kinds of vegetable juices), with *Saccharomycopsis lipolytica* (Harrison) Yarrow CBS 6124-2 of Centraalbureau voor Schimmelcultures of the Netherlands used as the opposite mating type. Formation of ascospores was observed within 48 hours of the culture.

*Note: J. Lodder: "The Yeasts, a Taxonomic Study," page 56, 1970 edition.

III. Physiological characteristics:
1. Optimum growth conditions:
   Optimum growth temperature: 25° to 35°C
   Optimum pH: 5 to 8
2. Growth ranges:
   Temperature: 15° to 39°C
   pH: 2 to 9.5
3. Assimilation of nitrates: Negative
4. Splitting of fat: Positive
5. Urease: Positive (on Christensen medium)
6. Gelatin liquefaction: Slight liquefaction
7. Osmotic pressure resistance: Slight growth observed after 20 days of culture on medium containing 10% NaCl.
8. Formation of carotenoids: Negative
9. Formation of organic acids: Positive
10. Vitamin-requiring property: Vitamin $B_1$ required.
11. Formation of starch-like compounds: Negative IV. Fermentation and assimilation of various carbon sources:

1. Fermentation test

| | | | |
|---|---|---|---|
| Glucose | − | Galactose | − |
| Sucrose | − | Maltose | − |
| Lactose | − | Raffinose | − |

2. Assimilation test

| | | | |
|---|---|---|---|
| D-Glucose | + | D-galactose | ± (very weak) |
| Sucrose | − | Maltose | − |
| Lactose | − | L-sorbose | − |
| Cellobiose | − | Trehalose | − |
| Melibiose | − | Raffinose | − |
| Melezitose | − | Inulin | − |
| Starch | − | D-xylose | − |
| L-arabinose | − | D-Arabinose | − |
| D-ribose | + | L-Rhamnose | − |
| Ethanol | + | Glycerol | + |
| Erythritol | + | Adonitol | − |
| Dulcitol | − | D-Mannitol | + |
| Sorbitol | − | α-Methyl glucoside | |
| Salicin | − | Lactate | + |
| Succinate | + | Citrate | + |
| Inositol | − | Arbutin | − |

The fact that this strain possesses the characteristics described above, particularly the fact that this strain, when subjected to mixed culture in conjunction with *Saccharomycopsis lipolytica* (Harrison) Yarrow CBS 6124-2 on V-8 agar medium, forms ascospores indicates that this strain belongs to the same species as that of *Saccharomycopsis lipolytica* (Harrison) Yarrow CBS 6124-2. Thus, the present strain has been identified as one belonging to the species of *Saccharomycopsis lipolytica* and designated as *Saccharomycopsis lipolytica* MT 1002. The aforementioned fact has also been confirmed by CBS (Centraalbureau voor Schimmelcultures) of the Netherlands. Besides, this *Saccharomycopsis lipolytica* MT 1002 has been deposited with Microorganic Industrial Technology Research Institute of the Agency of Industrial Science and Technology of the Japanese Government and NRRL in US on Oct. 27, 1973, under FERM 1610 and NRRL Y-7576, respectively.

Microorganisms usable in the present invention include not only the aforementioned *Saccharomycopsis lipolytica* MT 1002 and mutants thereof but also all yeasts belonging to the genus *Saccharomycopsis*, so far as they possess an ability to produce citric acid from hydrocarbons.

Mutation can be effected with high energy irradiation, such as with ultraviolet ray, $Co^{60}$ ray or Xray, or chemicals such as N-methyl-N'-nitro-N-nitrosoguanidine, sodium nitrite, hydroxylamine, nitrogen mustard, acenaphthene, etc.

Proper selection is made from those mutants which cannot grow on a medium containing only citric acid as a carbon source, inorganic salts and essential vitamins (to be referred hereafter as a citrate medium), but grow on a medium containing all necessary components for the microorganisms, for example, YM-medium. The method employed in the present case is that one platinum loop of *Saccharomycopsis lipolytica* MT 1002 is subjected to cultivation by shaking in 5ml of the YM medium at 28°C for 20 hours, after which the broth is centrifuged. Cells separated are added to 5ml of a phosphate buffer solution, and then N-methyl-N'-nitro-N-nitrosoguanidine is added in an amount of 0.2 mg per ml. The solution is kept at 28°C for 30 min. to preferably ensure about 99.9% mortality. Cells washed with steritized water are subjected to cultivation by shaking at 28°C for 5 to 6 hours in 5 ml of the YM medium before they are diluted and smeared on a YM agar medium.

Plate-culture selection is made of those strains which cannot grow on a citrate agar medium but grow only on a YM agar medium. Of these, strains are further selected showing highest yields of citric acid. Examples of such mutants are Saccharomycopsis lipolytica OA 1-3, MO 6-8, MN 3-1, and NT 1-33, whose deposition numbers are NRRL Y-7577 and Y-7578 (Oct. 27, 1973) and Y-7579 and Y-7580 (Oct. 29, 1973), respectively.

Hydrocarbons desirably used as raw materials for the present invention are saturated aliphatic hydrocarbons and unsaturated aliphatic hydrocarbons. Alternatively, aromatic hydrocarbons or alicyclic hydrocarbons having long aliphatic hydrocarbon groups in side chains thereof can be used, so far as they can be assimilated by the microorganisms belonging to the genus Saccharomycopsis. Use of normal paraffins proves to be desirable. Of the normal paraffins, those which have 9 or more carbon atoms are suitable, with those normal paraffins having from about 12 to about 19 carbon atoms such as, for example, tetradecane, pentadecane and hexadecane being especially advantageous. Normal paraffins may be used individually or in the form of a mixture of two or more members. Further, hydrocarbon mixtures containing normal paraffins such as, for example, kerosene and light oil may also be used. Other hydrocarbons which are usable in this invention include isoparaffins having 10 or more carbon atoms such as 2-methyl tetradecane and homologues thereof which are, olefins having 11 or more carbon atoms represented by $\alpha$-olefins having 11 carbon atoms such as 1-tetradecene, alkyl benzenes such as dodecyl benzene, and alkyl cycloparaffins such as dodecyl cyclohexane.

Nitrogen sources which are usable in this invention include inorganic nitrogen sources such as ammonium sulfate, ammonium phosphate, ammonium nitrate and ammonium chloride and organic nitrogen sources such as urea, peptone, casamino acid, corn steep liquor and meat extract. The various nitrogen sources mentioned above may be used either individually or in the form of a mixture of two or more members.

Examples of the inorganic salts which are usable in this invention are potassium phosphates, sodium phosphates and magnesium sulfate heptahydrate.

Besides those mentioned above, there may additionally be used vitamins, amino acids, peptides, nucleic acids and sources for growth factors and other organic microelements such as, for example, yeast extract, corn steep liquor, meat extract and malt extract. In the preparation of culture medium, salts such as of iron, zinc, manganese, calcium and copper may be added to serve as trace metals.

A typical composition of a culture medium usable in the present invention will be shown herein below by way of illustration. To distilled water, city water or well water, there are added 15 to 150 ml/lit. of normal paraffin, 1 to 10 g/lit. of a nitrogen source (such as ammonium chloride), 0.05 to 2 g/lit. of potassium dihydrogen phosphate, 0.05 to 2 g/lit. of potassium hydrogen phosphate or sodium hydrogen phosphate, 0.1 to 2 g/lit. of magnesium sulfate heptahydrate, 0.1 to 1.0 g/lit. of yeast extract or corn steep liquor, 0 to 2 mg/lit. of ferrous sulfate heptahydrate, 1 to 50 mg/lit. of zinc sulfate heptahydrate, 0.1 to 10 mg/lit. of manganese sulfate tetrahydrate, 2 to 50 mg/lit. of calcium chloride and 0 to 0.4 mg/lit. of copper sulfate.

A medium of a composition like the one shown above is adjusted to pH 6 to 7, sterilized at 120°C for 10 minutes and subsequently inoculated with a separately cultured citric acid-producing yeast belonging to the genus Saccharomycopsis such as Saccharomycopsis lipolytica MT 1002. The microorganism is subjected to culture under aeration, culture under aeration and agitation or shaking culture (with a reciprocating or rotary shaker) or other similar aerobic conditions at 25° to 37°C for 5 to 10 days, with the culture medium maintained at pH 3 to 7.

As the amount of citric acid accumulated in the culture medium increases to the extent of lowering the pH of the medium to a value not more than 3, the citric acid-producing ability of the yeast is degraded. At a proper time, such alkaline substance as calcium carbonate, calcium hydroxide, barium carbonate, potassium carbonate, potassium hydroxide, sodium carbonate, sodium hydroxide or aqua ammonia, particularly aqua ammonia, is added to the medium in a proper amount not so large as to turn the pH value of culture medium alkaline. The alkaline substance thus added serves to neutralize the greater part of citric acid and at the same time keep the culture medium at a neutral to weakly acidic pH value. The yield of citric acid can be improved by adding a proper surfactant (such as those marketed under tradenames of "Twin," "Noigen," "Span," and "Plysurf" for example.

Citric acid is accumulated in the form of a salt or partly in a free form in the culture medium.

In isolating citric acid from the culture medium, any of the means available for the separation and purification of citric acid may be employed. In case where the greater part of citric acid occurs in the form of calcium salt or barium salt, for example, the medium is acidified with sulfuric acid so as to have the citrate dissolved and then subjected to centrifugation to effect separation therefrom of cells and other precipitates (such as calcium sulfate or barium sulfate). Then, the resultant supernatant is neutralized with calcium carbonate, heated to educe precipitates and, while still hot, filtered to separate calcium citrate. To obtain citric acid from the calcium citrate, the calcium citrate is suspended in water of a volume 10 to 15 times as large and then sulfuric acid is gradually added to the suspension. In this case, sulfuric acid is added in an amount only slightly larger than is required to free calcium citrate and never in any large excess. The mixture is heated for some time and, while still hot, filtered and the resultant filtrate is concentrated. If calcium sulfate is educed in the early stage of the concentration, it is removed from the filtrate, after which renewed concentration is made. Then, the concentrate is cooled to educe citric acid crystals, which are separated by filtration and dried to give birth to citric acid.

In case where citric acid occurs in the form of ammonium, potassium or sodium salt in the culture medium at the end of fermentation, cells and other precipitates are removed as by means of centrifugation, for example, from the medium. The ammonium, potassium or sodium salt of citric acid is soluble in water and, therefore, is contained in the liquid phase. Then, the liquid phase is decationized by passage through an H-form cation-exchange resin, concentrated and subsequently cooled to educe citric acid crystals, which are separated by filtration and dried to afford citric acid.

The present invention will be described in detail herein below with reference to preferred embodiments which are solely illustrative of and not in any way limitative of this invention.

EXAMPLE 1

In a 1 liter of distilled water, 4 g of ammonium chloride, 0.5 g of peptone, 0.5 g of potassium dihydrogen phosphate, 0.5 g of potassium monohydrogen phosphate, 0.5 g of magnesium sulfate heptahydrate, 5 mg of zinc sulfate heptahydrate, 0.5 mg of manganese sulfate tetrahydrate, 10 mg of calcium chloride, 0.1 mg of copper sulfate pentahydrate, 50 mg of sodium chloride, 0.03 mg of ferrous sulfate heptahydrate, 600 mg of yeast extract and 50 mg of surfactant (tradename "Noigen ES 140") were dissolved and adjusted to pH 7. Portions of the solution, each 25 ml in volume, were placed in 500-ml shaker flasks. A normal paraffin having 13 to 16 carbon atoms was added in an amount of 1.5 g to each flask. The flasks and their contents were sterilized at 120°C for 10 minutes.

*Saccharomycopsis lipolytica* MT 1002 separately cultured was inoculated to the medium prepared as described above and subjected to shaking culture at 30°C. The shaker was operated at a rate of 120 reciprocating motions per minute of an amplitude of 7 cm. About 24 hours afterward, 1.5 g each of separately sterilized calcium carbonate was added to the flasks.

After 7 days of continuous shaking culture, the medium was sampled and analyzed. The analysis showed that the culture had produced 68.5 g of citric acid and 3.5 g of iso-citric acid per liter of the medium.

One liter on the resultant culture liquor was acidified with sulfuric acid, deprived of cells by centrifugation, neutralized with calcium carbonate, heated to educe a precipitate and, while still hot, filtered to separate the precipitate. Finally, 82.4 g of calcium citrate was obtained by drying the filtrate. This citrate was suspended in 800 ml of water, freed with sulfuric acid and filtered, while still hot. Then, the filtrate was concentrated. As calcium sulfate occurred in the course of the concentration, it was removed, after which renewed concentration was made. Finally, the concentrate was cooled. The educed crystals were separated by filtration and dried to afford 61.6 g of citric acid (anhydrons).

EXAMPLE 2

In 10 liters of deionized water, 40 g of ammonium chloride, 5 g of potassium dihydrogen phosphate, 5 g of potassium monohydrogen phosphate, 5 g of magnesium sulfate heptahydrate, 10 mg of manganese sulfate tetrahydrate, 5 mg of zinc sulfate heptahydrate, 100 mg of calcium chloride, 0.5 g of sodium chloride, 0.5 mg of copper sulfate and 5 g of yeast extract were dissolved. The solution was placed in a jar fermentor and 700 g of a mixture of normal paraffins having from 13 to 18 carbon atoms was added thereto. The fermentor and its contents were sterilized at 120°C for 10 minutes and cooled to 30°C and, thereafter, 500 ml of a seed yeast of *Saccharomycopsis lipolytica* MT 1002 was inoculated to the medium in the fermentor. Then, the contents held at 30°C and agitated at a rate of 600 rpm, with aeration continued at a rate of 1 VVM (5.7 liters per minute), to induce culture. In the course of culture, separately sterilized calcium carbonate was added from time to time to effect pH adjustment.

After 110 hours of culture under aeration and agitation, the culture solution was sampled and analyzed. The analysis showed that the culture had produced 86.5 g/lit. of citric acid and 7.5 g/lit. of isocitric acid.

The culture liquor thus obtained was treated by following the procedure of Example 1 to separate citric acid. Consequently, there was obtained 815 g of citric acid (anhydrons) from the whole culture liquor.

EXAMPLE 3

In one liter of distilled water, 2 g of ammonium chloride, 0.1 g of potassium dihydrogen phosphate, 0.1 g of potassium monohydrogen phosphate, 0.5 g of magnesium sulfate heptahydrate, 5 mg of zinc sulfate heptahydrate, 1 mg of manganese sulfate tetrahydrate, 10 mg of calcium chloride, 0.2 mg of copper sulfate pentahydrate, 100 mg of sodium chloride, 500 mg of yeast extract, and 100 mg of a surfactant (tradename "Noigen ES 90") were dissolved and adjusted to pH 7. Portions of the solution, each 25 ml in volume, were placed in a 500 ml shaking flask. A normal paraffin having 13 to 16 carbon atoms was added, in an amount of 1.125 g, to the flasks. The flasks and their contents were sterilized at 120°C for 10 minutes.

*Saccharomycopsis lipolytica* OA 1-3 separately cultured was inoculated to the medium prepared as described above and shaking calture was carried out by following the procedure of Example 1. After about 12 hours from the start of culture, pH of the culture medium was controlled at 6 with a 2 N aqua ammonia twice a day.

After 7 days of shaking culture, the culture liquor was sampled and analyzed. The analysis showed that the culture had produced 67.8 g of citric acid and 7.7 g of iso-citric acid per liter of the culture liquor.

The same procedure was effected with *Saccharomycopsis lipolytica* NT 1-33 and MN 3-1.

| Microorganism | Citric acid | | Iso-citric acid | |
|---|---|---|---|---|
| | concentration % | yield g/l | concentration % | yield g/l |
| OA 1-3 | 67.8 | 150.7 | 7.7 | 17.1 |
| NT 1-33 | 67.7 | 150.3 | 8.7 | 19.3 |
| MN 3-1 | 70.5 | 156.6 | 8.7 | 19.3 |

EXAMPLE 4

Example 4 was similar to Example 3 except that *Saccharomycopsis lipolytica* MO 6-8 was used and neutralization was effected with a 2 N aqua sodium hydroxide solution in place of a 2 N aqua ammonia. The analysis showed 45.4 g of citric acid and 22.8 g of iso-citric acid per liter.

What we claim is:

1. A method for the production of citric acid, which comprises aerobically culturing a yeast belonging to the species *Saccharomycopsis Lipolytica* and possessing an ability to produce citric acid by assimilating, as a main carbon source, at least one hydrocarbon in a culture medium which uses said assimilable compound and contains nitrogen sources, inorganic salts and, if necessary, other suitable nutrient sources thereby accumulating citric acid in the culture medium and isolating the formed citric acid from the culture medium.

2. A method according to claim 1, wherein the hydrocarbon is of aliphatic type.

3. A method according to claim 2, wherein the hydrocarbon is at least one of normal paraffins.

4. A method according to claim 3, wherein the hydrocarbon is a normal paraffin having at least 9 carbon atoms.

5. A method according to claim 4, wherein the hydrocarbon is one member selected from the group consisting of normal paraffins having from 12 to 19 carbon atoms.

6. A method according to claim 1, wherein the hydrocarbon is an iso-paraffin having at least 10 carbon atom.

7. A method according to claim 1, wherein the hydrocarbon is one member selected from the group consisting of olefins, alkyl benzenes and alkyl cycloparaffins having at least 11 carbon atoms.

8. A method according to claim 7, wherein the hydrocarbon is dodecylbenzene.

9. A method according to claim 2, wherein the hydrocarbon is olefin having at least 11 carbon atoms.

10. A method according to claim 1, wherein the yeast is *Saccharomycopsis lipolytica* NRRL Y-7576, Y-7577, Y-7578, Y-7579 or Y-7580.

11. A method according to claim 1, wherein the culturing is effected at a temperature of from 25°C to 37°C.

12. A method according to claim 1, wherein the culturing is effected by keeping the pH at from 3 to 7.

13. A method according to claim 12, wherein an alkaline substance is added to the culture medium during the culturing.

14. A method according to claim 13, wherein the alkaline substance is ammonia water, NaOH, $CaCO_3$, KOH or $Ca(OH)_2$.

15. A method according to claim 1, wherein a surfactant is added to the medium.

* * * * *

Disclaimer 3,902,965.—*Toshiro Furukawa* and *Hiroo Kaneyuki*, Yamaguchi, Japan. METHOD FOR PRODUCTION OF CITRIC ACID. Patent dated Sept. 2, 1975. Disclaimer filed Sept. 1, 1977, by the assignee, *Mitsui Petrochemical Industries*.

Hereby enters this disclaimer to claims 1, 2, 3, 4 and 11 of said patent.

[*Official Gazette October 11, 1977.*]